US008257010B2

(12) United States Patent
Hirosawa et al.

(10) Patent No.: US 8,257,010 B2
(45) Date of Patent: Sep. 4, 2012

(54) BAR FEEDER

(75) Inventors: Kiyoshi Hirosawa, Chikusei (JP); Takazo Ito, Hachioji (JP); Kenji Sato, Yachiyo (JP)

(73) Assignee: Ikura Seiki Co., Ltd. (JP)

( * ) Notice: Subject to any disclaimer, the term of this patent is extended or adjusted under 35 U.S.C. 154(b) by 251 days.

(21) Appl. No.: 12/354,526

(22) Filed: Jan. 15, 2009

(65) Prior Publication Data

US 2009/0180856 A1    Jul. 16, 2009

(30) Foreign Application Priority Data

Jan. 16, 2008    (JP) .................................. 2008-007146

(51) Int. Cl.
*B23Q 7/10* (2006.01)
*B23Q 7/05* (2006.01)
*B21D 43/00* (2006.01)
*B21B 39/00* (2006.01)

(52) U.S. Cl. .................. 414/746.2; 414/746.1

(58) Field of Classification Search .................. 193/40; 198/463.3, 463.5, 463.6; 221/241, 273–274; 414/15, 22.62, 745.1, 745.4, 745.7–745.9, 414/746.1–746.4, 746.6, 746.8; 82/125–127
See application file for complete search history.

(56) References Cited

U.S. PATENT DOCUMENTS

| | | | | |
|---|---|---|---|---|
| 2,710,104 A * | 6/1955 | Putnam | ........................ | 414/198 |
| 3,094,242 A * | 6/1963 | Kay et al. | ...................... | 221/241 |
| 3,182,816 A * | 5/1965 | Illo | ............................ | 414/746.4 |
| 3,583,576 A * | 6/1971 | Lakins | ........................ | 414/745.9 |
| 3,724,648 A * | 4/1973 | Schaller | ........................ | 198/443 |
| 3,999,684 A * | 12/1976 | Ekholm | ........................ | 221/301 |
| 5,366,334 A * | 11/1994 | Cucchi | ............................ | 414/15 |
| 5,769,597 A * | 6/1998 | Tsune | ........................ | 414/746.2 |
| 2002/0098073 A1 * | 7/2002 | Drei et al. | .................. | 414/746.2 |
| 2006/0153666 A1 * | 7/2006 | Hirosawa et al. | ............... | 414/14 |

FOREIGN PATENT DOCUMENTS

JP    2505419    5/1996

* cited by examiner

*Primary Examiner* — Gregory Adams
(74) *Attorney, Agent, or Firm* — Studebaker & Brackett PC; Donald R. Studebaker

(57) ABSTRACT

Disclosed is a bar feeder, which is capable of reliably loading a bar onto a guide rail with a simplified structure. The bar feeder 1 comprises a stock rack 8, a guide rail 4 for guiding a bar to a bar machining apparatus, and a bar supply mechanism 32 for taking bars W one by one out of the stock rack 8 and supplying the taken-out bar W onto the guide rail 4. The bar supply mechanism 32 includes a lifting member 40 adapted to lift a downstreammost one of the bar W on the stack rack 8, a bar receiving member 42 adapted to receive thereon the lifted bar W and supply the bar W onto the guide rail 4, and a stopper member 36 adapted to holds a second-downstreammost one of the bar W to be subsequently supplied. The lifting member 40 and the bar receiving member 42 are adapted to be driven by a common moving device 44, in such a manner that the lifting member 40 is linearly moved in an upward-downward direction in conjunction with a swing movement of the bar receiving member 42. The structure designed to drive the lifting member 40 and the bar receiving member 42 by the common moving device 44 makes it possible to reduce the number of components for a driving section, and achieve structural simplification.

6 Claims, 8 Drawing Sheets

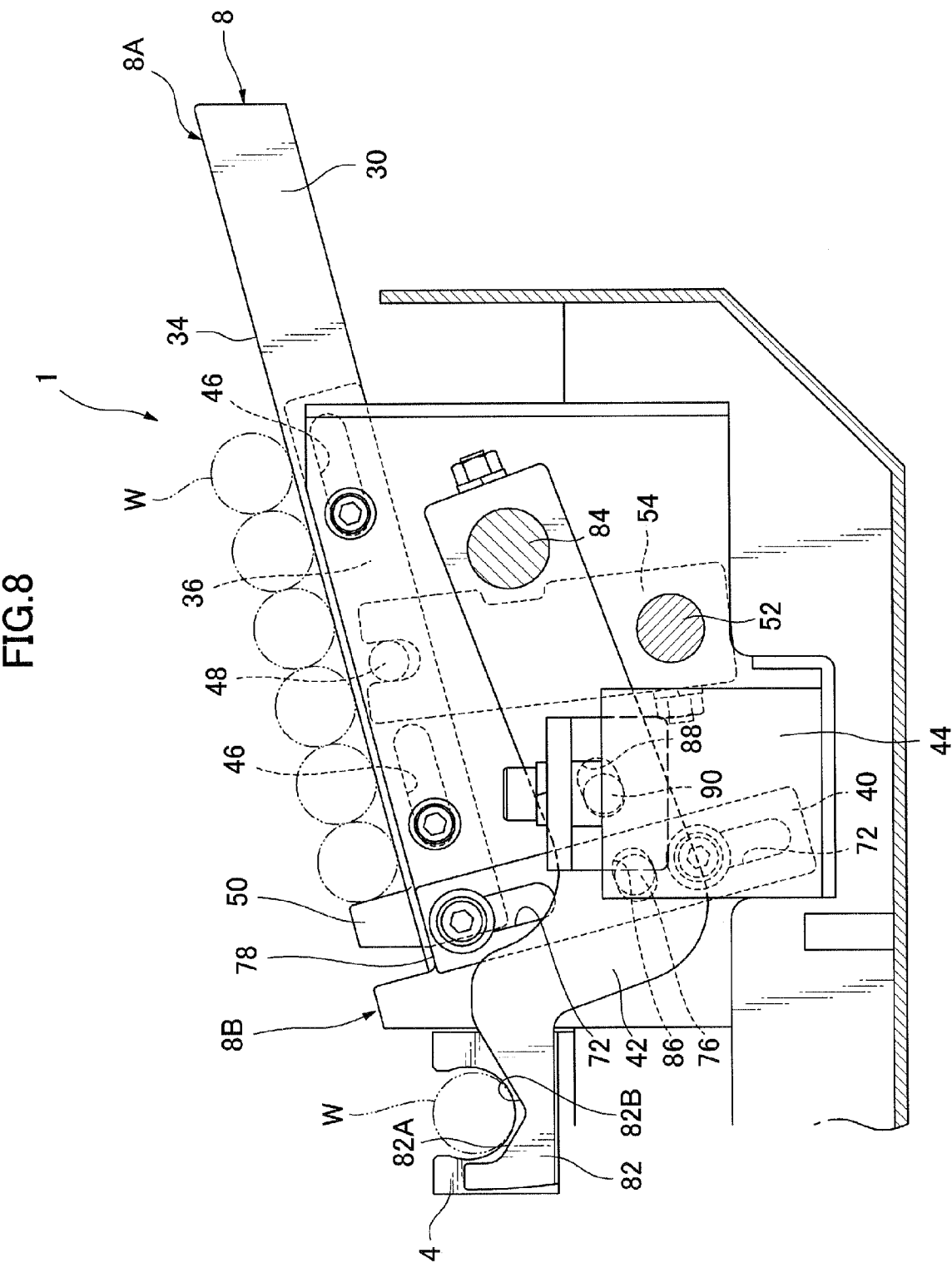

BAR FEEDER

BACKGROUND OF THE INVENTION

1. Field of the Invention

The present invention relates to a bar feeder for automatically feeding a bar to a bar machining apparatus.

2. Description of the Background Art

As a conventional bar feeder, there has been known one type designed such that one of a plurality of pieces of bars placed on a stock rack is pushed upwardly by a lifting arm, and the lifted bar material is received by a bar transfer arm and transferred to a guide rail by swinging the bar transfer arm, as disclosed, for example, in the Japanese Utility Model 2505419. In this type of bar feeder, a bar material is received by the bar transfer arm and transferred to the guide rail. Thus, a shock against the guide rail is less than that in another type designed to perform a bar loading operation by dropping a bar material from the stock rack onto the guide rail. This makes it possible to reduce vibration and noise in the bar feeder.

However, in the above bar feeder, it is required to equip each of the lifting arm and the bar transfer arm with a moving mechanism respectively, which causes an increase in the number of components of the bar feeder, and an extra maintenance task. Moreover, during the process of transferring a bar material to the guide rail, it is necessary to swing the bar transfer arm to a position adjacent to the lifting arm, and then move the lifting arm upwardly, in order to reliably pass a bar material from the lifting arm to the bar transfer arm. Therefore, in the above type of bar feeder, it is essential to set a timing of the movement of the lifting arm relative to the bar transfer arm.

SUMMARY OF THE INVENTION

It is therefore an object of the present invention to provide a bar feeder capable of reliably loading a bar stock piece onto a guide rail with a simplified structure.

In order to achieve this object, the present invention provides a bar feeder for feeding a bar to a bar machining apparatus along a feed axis, comprising a stock rack having a bar mount surface for allowing a bar or bars to be placed thereon, a guide rail for guiding one of the bar which is extracted from the stock rack, and a bar supply mechanism for taking the bar one by one out of the stock rack and supplying the taken-out bar onto the guide rail, wherein the bar mount surface is inclined downwardly in a direction from an upstream of the bar mount surface far from the guide rail to a downstream of the bar mount surface close to the guide rail, and the bar supply mechanism includes a stopper member protruding upwardly from the bar mount surface at the downstream to prevent the bar from dropping from the bar mount surface, a lifting member adapted to move upwardly at the downstream edge of the bar mount surface to lift only a downstreammost one of the bar which is adjacent to the stopper member, a bar receiving member connecting the lifting member thereto and having a receiving portion, for receiving the bar lifted by the lifting member, and adapted to supply the bar received in the receiving portion to the guide rail, moving means adapted to move the bar receiving member and the lifting member between a bar receiving position where the downstreammost bar is lifted from the bar mount surface up to a height of the stopper member and the receiving portion is aligned with the lifting member, and a bar loading position where the lifting member is retracted to a height equal to or below that of the bar mount surface and the receiving portion is located at a height equal to or below that of the guide rail, and stopper-member reciprocating means adapted to reciprocate the stopper member along the bar mount surface between a bar takeout position where only a downstreammost one of the bar is permitted to be located above the lifting member when the lifting member is in the bar loading position, and a holding position where the stopper member approaches to and holds a second-downstreammost one of the bar to be subsequently supplied when the lifting member is in the bar receiving position.

In the bar feeder of the present invention, when the stopper member is in the bar takeout position, as the moving means moves the bar receiving member and the lifting, the lifting member is moved upwardly, and the bar receiving member is moved to the bar receiving position where the receiving portion of the bar receiving member is aligned with the lifting member. In the bar receiving position, one of the bar is lifted by the lifting member, and received by the receiving portion of the bar receiving member. Then, the stopper-member reciprocating means is driven to move the stopper member from the bar takeout position to the holding position to hold a bar to be subsequently supplied. Under a condition that the stopper member is in the holding position, when each of the bar receiving member and the lifting member is moved from the bar receiving position to the bar loading position by the moving means, the lifting member is retracted to the height position equal to or below the bar mount surface, and the receiving portion of the bar receiving member is located at the height position equal to or below that of the guide rail to supply the bar onto the guide rail.

As above, in the bar feeder of the present invention, both the lifting member and the bar receiving member are moved by the common moving means. Thus, as compared with a conventional bar feeder having an independent driving unit for each of the lifting member and the bar receiving member, the number of driving units can be reduced to allow the bar feeder to be structurally simplified. This also makes it possible to simplify a maintenance task of the bar feeder. In addition, the lifting member and the bar receiving member are interlocked together, and moved in conjunction with each other by the common moving means. This makes it possible to reliably transfer a bar onto the guide rail without a need for adjusting a timing of the actuation of the lifting member relative to the bar receiving member. Furthermore, since the stopper member is adapted to be reciprocatingly movable between the bar takeout position and the holding position, a bar to be subsequently supplied is held by the stopper member, during the operation of taking the downstreammost bar out of the bar mount surface by the lifting member. Thus, the bar to be subsequently supplied does not roll down along the bar-stock mount surface of the stock rack and hitting against the stopper member to impose a shock load thereon. This makes it possible to reduce a shock against the second-downstreammost bar, and reduce vibration of the bar feeder and noise due to the shock of the second-downstreammost bar.

Preferably, in the bar feeder of the present invention, the bar receiving member is adapted to be swing, and the lifting member is adapted to linearly move, whereby, when the bar receiving member is moved from the bar loading position to the bar receiving position, the receiving portion approaches to the lifting member, and is positioned to be in continuous relation with a bar-lifting top surface of the lifting member the bar receiving position.

According to this feature, the bar receiving member is adapted to swing, and the lifting member is adapted to linearly move, wherein the receiving portion is positioned to be in continuous relation with the bar-lifting top surface of the lifting member at the bar receiving position, so that the downstreammost bar lifted by the lifting member is smoothly received into the receiving portion.

This makes it possible to allow the downstreammost bar to be received into the receiving portion without being damaged and imposing a shock load to the bar feeder.

Preferably, in the bar feeder of the present invention, the bar-lifting top surface of the lifting member extends to a vicinity of the guide rail with a downward inclination, and the receiving portion has an inclined surface which is in continuous relation with the bar-lifting top surface at the bar receiving position.

According to this feature, the bar-lifting top surface extends to the vicinity of the guide rail with a downward inclination, and the inclined surface of the receiving portion is in continuous relation with the bar-lifting top surface at the bar receiving position, so that the downstreammost bar lifted by the lifting member is introduced into the receiving portion by moving on the bar-lifting top surface and the inclined surface of the receiving portion.

This makes it possible to allow the downstreammost bar stock piece to be received into the receiving portion without being damaged the downstreammost bar stock piece and imposing a shock load to the bar feeder.

Preferably, the bar feeder of the present invention further comprises a bar restriction member disposed above the stock rack and in spaced-apart relation each other by a distance corresponding to a diameter of the bar, for arranging the bars in a line on the stock rack, and restriction-member driving means adapted to move the bar restriction member closer and farther relative to the bar mount surface.

According to this feature, an upward movement of the bar placed on the stock rack is restricted by the bar-stock restriction member, so that the bars are arranged in a line along the bar mount surface of the stock rack.

Thus, the bar-stock restriction member can prevent the bars placed on the stock rack from being stacked in an upward direction on the bar mount surface of the stock rack. This also allows the bar supply mechanism to reliably take the bar one by one from an array of bars arranged in a line.

More preferably, the bar of the present invention includes a controller for controlling the restriction-member driving means so as to determine a distance from the bar mount surface to the bar restriction member depending on an input of a diameter of bar to be machined.

According to this feature, the bar stock feeder has the controller, wherein the controller is operable to determine a moving distance of the bar restriction member depending on an input of a diameter of bar, and the restriction-member driving means drives the bat restriction member to move based on the set moving distance.

Thus, the moving distance of the bar restriction member can be automatically determined by a simple operator's operation of inputting a diameter of bar to be machined, into the controller. This makes it possible to perform a task associated with a change in diameter of bar, in a simple manner and within a short period of time.

Preferably, the bar feeder of the present invention includes a controller for controlling a actuation of the stopper-member reciprocating means so as to determine the bar takeout position and the holding position depending on the input of the diameter of the bar to be machined.

According to this feature, the bar feeder has the controller, wherein the controller is operable to determine the bar takeout position and the catching position depending on the input of a diameter of bar so as to change the reciprocating distance of the stopper-member reciprocating means.

Thus, the bar takeout position and the holding position can be automatically determined by a simple operator's operation of inputting a diameter of bar to be machined, into the controller. This makes it possible to perform a task associated with a change in diameter of bar, in a simple manner and within a short period of time.

BRIEF DESCRIPTION OF THE DRAWINGS

FIG. 8 is an diagram showing an operation of the bar feeder according to the embodiment.

DESCRIPTION OF THE PREFERRED EMBODIMENTS

With reference to accompanying drawings, the present invention will now be described based on a preferred embodiment thereof.

Figure 1:
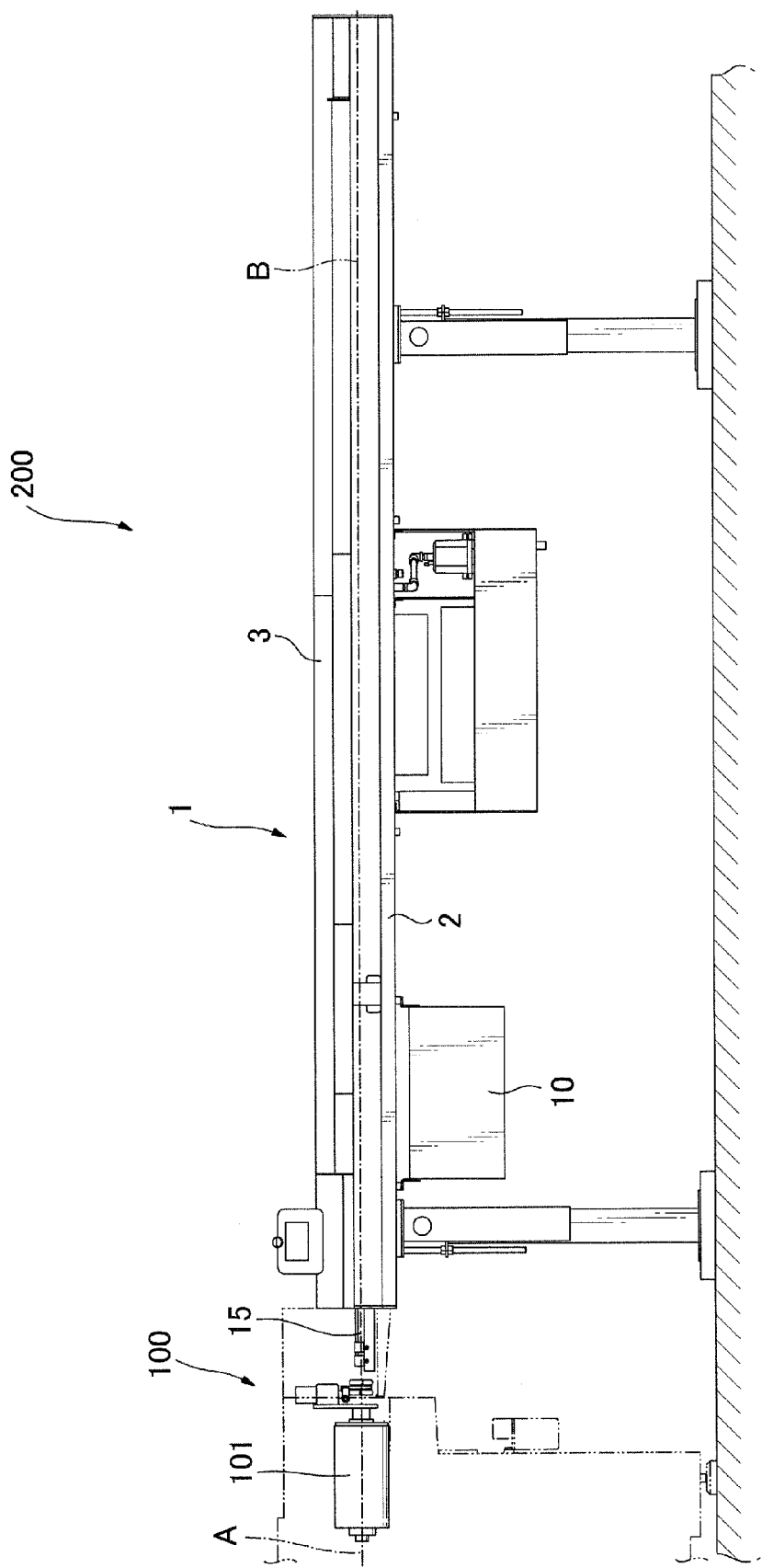
FIG. 1 is a general side view showing a bar feeder according to one embodiment of the present invention.
Figure 2:
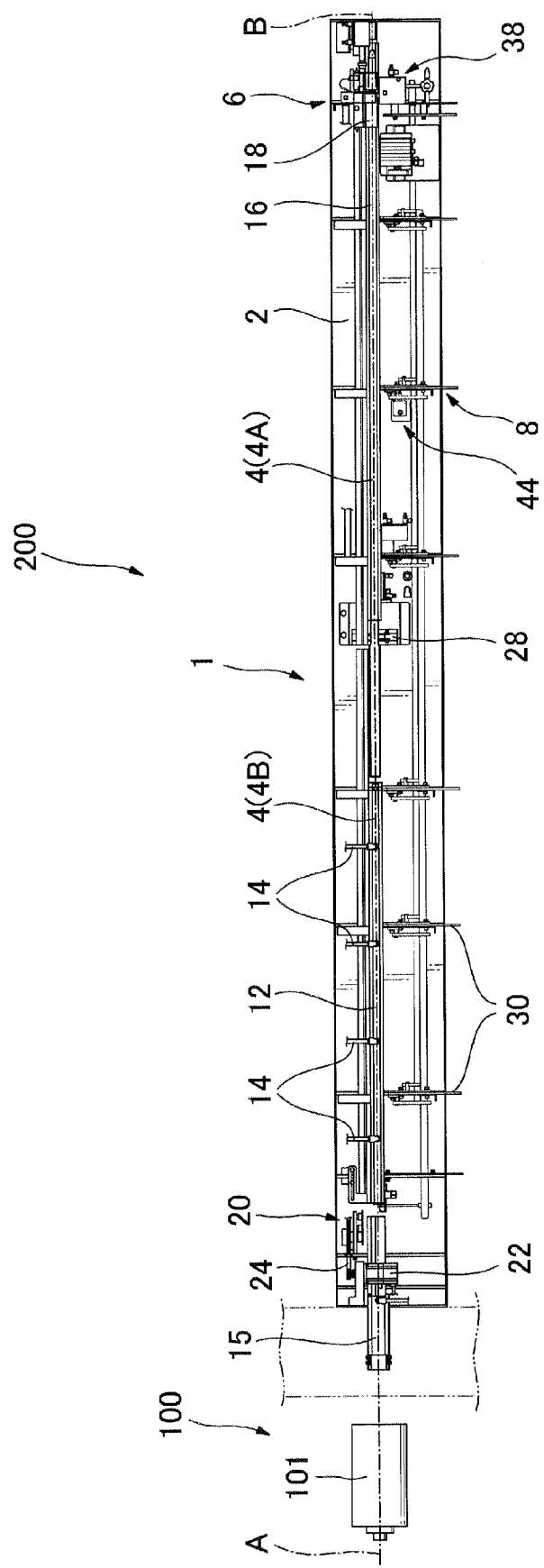
FIG. 2 is a general top plan view showing the bar feeder according to the embodiment.

FIG. 1 is a general side view showing a bar feeder 1 according to one embodiment of the present invention, and FIG. 2 is a general top plan view showing the bar feeder 1 without a cover 3 covering an upper portion of the bar feeder 1 shown in FIG. 1.

The bar feeder 1 is disposed adjacent to a bar machining apparatus 100, and a bar machining system 200 is made up of the bar feeder 1 and the bar machining apparatus 100. For example, the bar machining apparatus 100 is a stationary main spindle-type NC lathe which comprises a headstock 101 including a main spindle A, and a machining section (not shown) for machining a bar piece supported by the headstock 101. The bar feeder 1 is adapted to feed bars W to the bar machining apparatus 100 one by one along a feed axis B aligned with the main spindle A.

In this embodiment, since the bar W is fed toward the bar machining apparatus 100 in the bar feeder 1, a position of the bar feeder 1 far from the bar machining apparatus 100 will be referred to as "upstream", and a position of the bar feeder 1 close to the bar machining apparatus 100 will be referred to as "downstream".

As mainly shown in FIG. 2, the bar feeder 1 comprises a support frame 2 extending parallel to the feed axis B, a guide rail 4 supported by the support frame 2 to guide a bar W along the feed axis B, a feed mechanism 6 for feeding a bar on the guide rail 4 to the bar machining apparatus 100 along the feed axis B, a stock rack 8 on which a plurality of bars W to be supplied onto the guide rail 4 are placed, and a controller 10 (see FIG. 1) for controlling an operation of the bar feeder 1.

The guide rail 4 extends parallel to the feed axis B over a longitudinal direction of the bar feeder 1, and includes an upstream guide rail 4A and a downstream guide rail 4B. The sectional shape of the guide rail 4 is formed in an arc, and the guide rail 4 has an inner surface capable of holding a bar W thereon. According to the arc shape of the guide rail 4, a center of a bar W supplied into the guide rail 4 is stably located at the same position with respect to a widthwise direction of the guide rail 4 irrespective of a diameter of the bar W.

The downstream guide rail 4B is provided with a cover 12 covering a top plane of the downstream guide rail 4B. This cover 12 has a plurality of oil supply holes (not shown) formed therein at certain intervals along a longitudinal direction thereof, and a plurality of oil supply pipes 14 are connected to the respective oil supply hole. The oil supply pipes 14 are connected to a pump (not shown) for supplying oil into the downstream guide rail 4B. Typically, cutting oil is used as the oil. An anti-vibration device 15 is provided between the downstream guide rail 4B and the bar machining apparatus 100 for suppressing vibration due to a rotation of a bar W during machining of the bar W. In cases where the anti-vibration device 15 is designed to suppress vibration due to machining of a bar W by means of oil supplied inside a cylindrical-shaped member thereof, an oil supply pipe connected to the above mentioned pump is connected to the anti-vibration device in the same manner as that in the downstream guide rail 4B.

Figure 3:
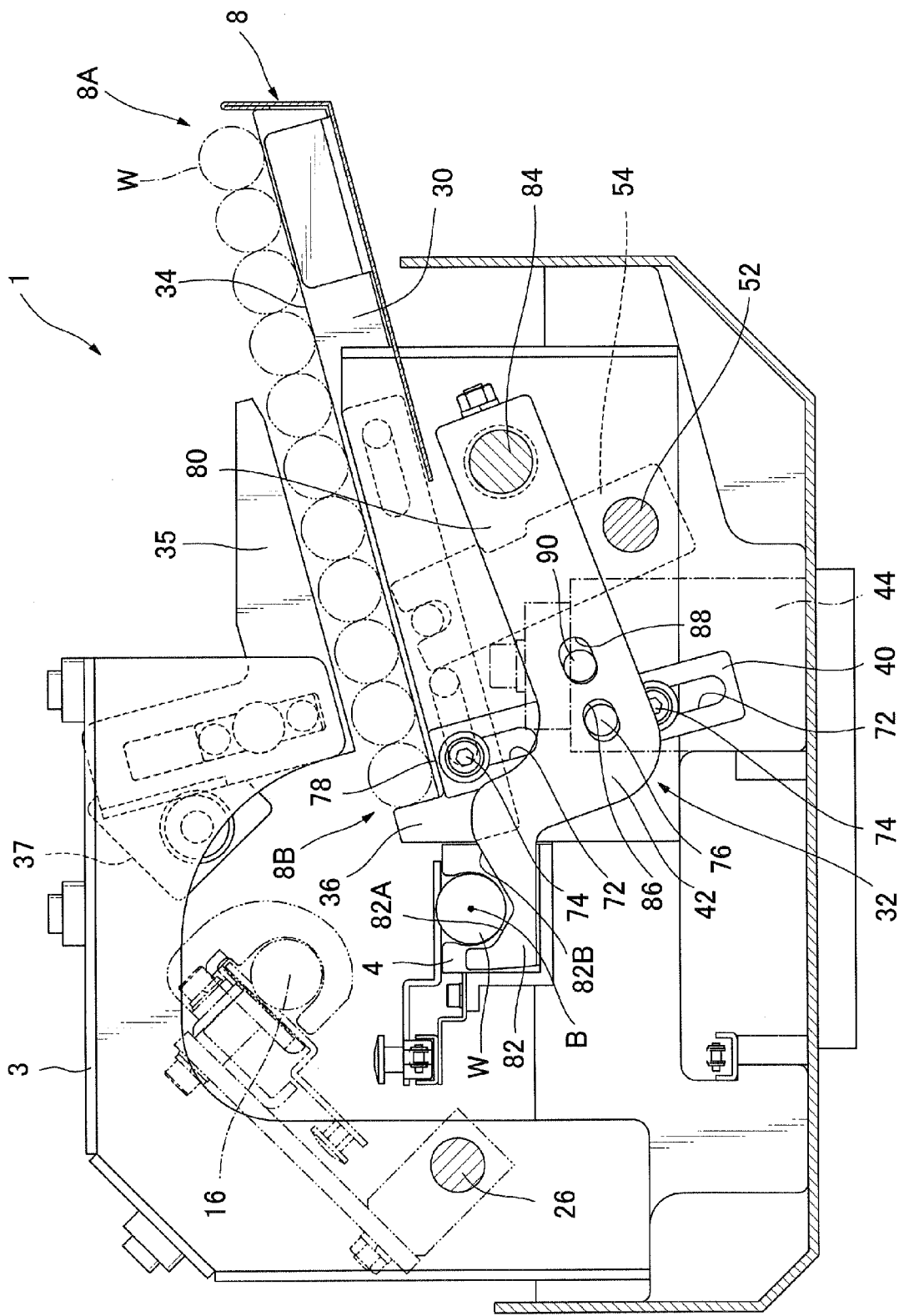
FIG. 3 is a sectional side view showing a bar supply mechanism of the bar feeder according to the embodiment.

FIG. 3 is a sectional side view of the bar feeder 1 according to the embodiment. As shown in FIGS. 2 and 3, the feed mechanism 6 includes an initial-feed member (not shown) for feeding a bar W supplied onto the upstream guide rail 4A to the downstream guide rail 4B (initial feed), and a feed rod 16 for feeding the initially-fed bar W toward the bar machining apparatus 100.

The initial-feed member is formed in a block shape, and disposed inside an arc-shaped space of the upstream guide rail 4A. The initial-feed member is movable inside the guide rail 4 along the longitudinal direction of the upstream guide rail 4A. The initial-feed member is connected to an initial-feed-member driving mechanism (not shown) for moving the initial-feed member along the longitudinal direction of the guide rail 4.

The feed rod 16 is cantileveredly supported in such a manner that an upstream end thereof is fixed to a support member 18. The support member 18 is associated with a feed-rod driving mechanism 20 for moving the feed rod 16 along the longitudinal direction of the guide rail 4. The feed-rod driving mechanism 20 includes a servomotor 22, and an endless chain 24 associated with the support member 18. As shown in FIG. 3, the feed rod 16 is able to swing around a shaft 26 by a driving of a feed-rod swinging mechanism (not shown). According to the swing movement, the feed rod 16 is movable between a feed position where it is located inside the guide rail 4 to feed an initially-fed bar W, and a rest position where it is located above the guide rail 4. The feed rod 16 has a chuck (not shown) for holding an upstream end of an initially-fed bar W. The support frame 2 has a clamp device 28 (see FIG. 2) attached thereto to immovably clamp the initially-fed bar W when the chuck of the feed rod 16 holds the upstream end of the initially-fed bar W.

The stock rack 8 includes a plurality of stock-rack frames 30 each extended perpendicular to the feed axis B, and a bar supply mechanism 32 for taking one of a plurality of bar W out of the stock rack frames 30 and supplying the taken-out bar W onto the guide rail 4.

As shown in FIG. 3, each of the stock-rack frames 30 is fixed to the support frame 2 through one edge thereof on the side of the guide rail 4, and inclined obliquely downwardly in a direction from an upstream 8A of the mount surface far from the guide rail 4 to a downstream 8B of the mount surface close to the guide rail 4, so that an inclined bar mount surface 34 is defined by top surfaces of the stock-rack frames 30.

A bar-stock restriction plate (bar-stock restriction member) 35 is disposed above the bar mount surface 34 to restrict a plurality of bars W placed on the bar mount surface 34 so as to arrange the bar W in a line on the stock rack 8. The bar restriction plate 35 is designed such that a height thereof relative to the bar mount surface 34 is adjustable by an adjusting mechanism 37 using for example a motor.

The bar supply mechanism 32 includes a stopper member 36 for preventing the bars W from dropping from the bar mount surface 34 on the downstream side 8B of the mount surface of the stock rack 8, a stopper-member reciprocating device 38 (FIG. 4) for reciprocating the stopper member 36 along the bar mount surface 34, a lifting member 40 for lifting only a downstreammost one of the bar W which is adjacent to the stopper member 36, a bar receiving member 42 for receiving the downstreammost bar W lifted by the lifting member and supplying it to the guide rail 4, and a moving device 44 for moving the lifting member 40 and the bar receiving member 42 between a bar loading position for receiving one of the bar W from the stock rack 8, and a bar receiving position for supplying the received bar W onto the guide rail 4.

Figure 4:
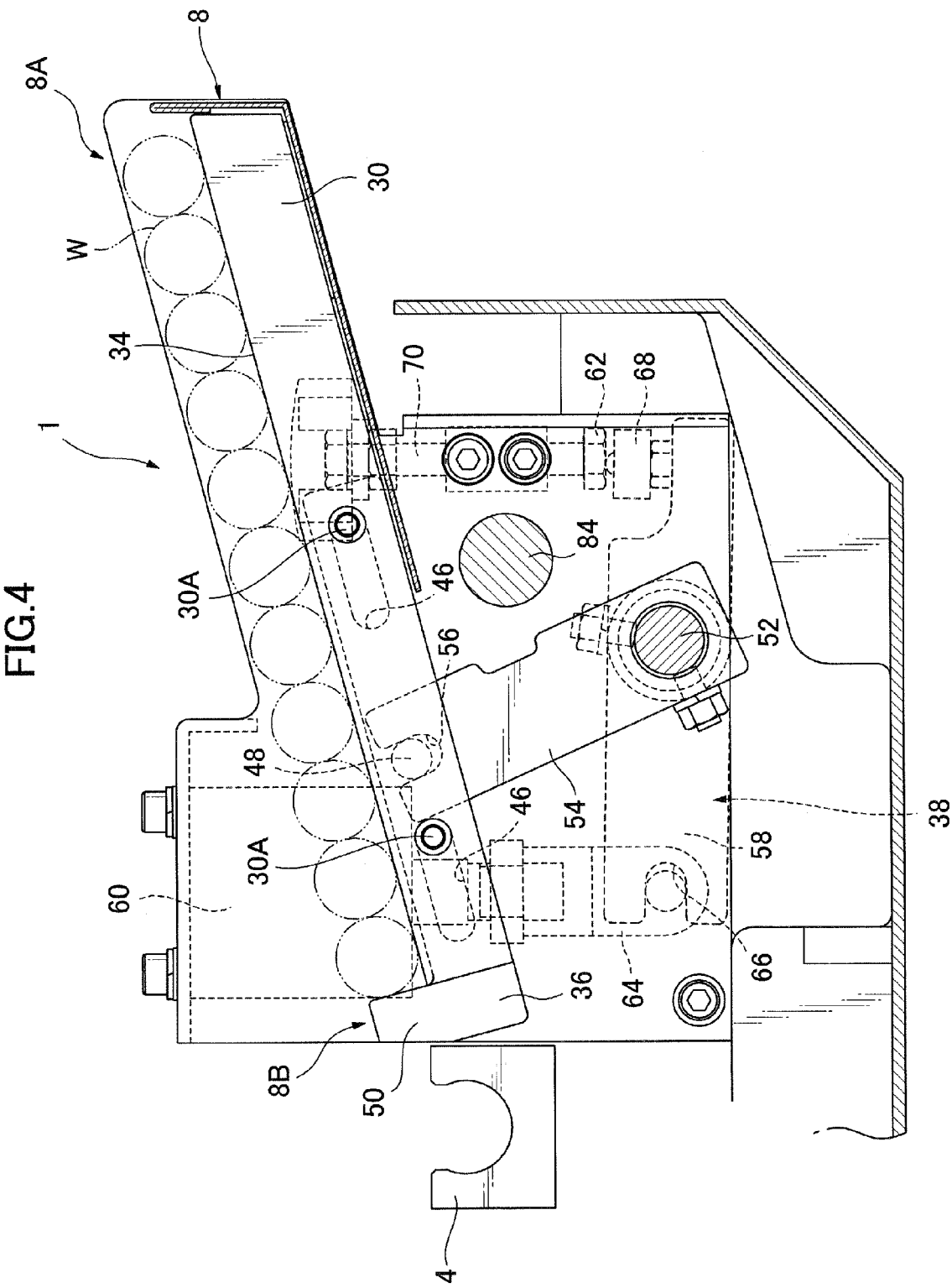
FIG. 4 is a sectional side view showing a stopper member and a stopper-member reciprocating device of the bar feeder according to the embodiment.

FIG. 4 shows the stopper member 36 and the stopper-member reciprocating device 38 of the bar feeder 1 according to the embodiment.

A plurality of the stopper member 36 is mounted on a lateral wall of a the stock-rack frames 30 and extends along the bar mount surface 34 of the stock-rack frame 30. Each of the stopper members 39 is formed with two elongate holes 46 along a longitudinal direction thereof, and two protrusions 30A protruding from the stock-rack frame 30 are received in respective ones of the elongate holes 46. That is, the stopper member 39 is attached to the stock-rack frame 30 in such a manner the stopper member is slidable along the elongated holes 46, i.e., along the bar mount surface 34 of the stock-rack frame 30. Further, the stopper member 36 is provided with a protrusion 48 at an approximately longitudinally central position thereof.

One end of the stopper member 36 on the side of the downstream 8B of the bar mount surface 34 is formed as a hook-like holding portion 50 which protrudes upwardly from and approximately perpendicularly to the bar mount surface 34. The bar W placed on the stock rack 8 are held on the bar mount surface 34 by the holding portions 50.

The protrusion 48 of the stopper member 36 provided at the approximately longitudinally central position thereof is associated with a swing arm 54 swingable around a shaft 52. The swing arm 54 has a base end fixed to the shaft 52, and a distal end formed with a U-shaped cutout 56 which is engaged with the protrusion 48. The shaft 52 is located below the stopper member 36, whereby the swing arm 54 has a longitudinal axis extending in an upward-downward direction. That is, the stopper member 36 and the swing arm 54 are arranged to form a generally T shape. The plurality of stopper members 36 provided in the respective stock-rack frames 30 are fixed to the shaft 52, and connected to each other through the shaft 52.

The stopper-member reciprocating device 38 includes: an actuator member 58 fixed to the shaft 52; a cylinder 60 connected to one end (a first end) of the actuator member 58 and adapted to move the stopper member 36 between a bar take-out position where only the downstreammost one of the bar W on the side of the downstream 8B of the mount surface is permitted to be located on or above the lifting member 40, and a holding position where the stopper member 36 approaches to and holds a second-downstreammost one of the bar W to be subsequently supplied; and a stopper 62 disposed at a position contactable with the other end (a second end) of the actuator member 58 to restrict a rotation angle of the actuator member 58, i.e., a moving distance of the stopper member 36.

The actuator member 58 is fixed to the shaft 52 at an approximately longitudinally central position thereof, and the first end thereof on the side of the cylinder 60 is formed with a U-shaped cutout 66 which is engaged with an distal end of a piston rod 64 of the cylinder 60. The second end of the actuator member 58 on the side of the stopper 62 is formed with a contact portion 68 adapted to be brought into contact with of the stopper 62.

The stopper 62 faces to the contact portion 68, and screwed with an externally threaded bolt 70. The bolt 70 is adapted to be rotated by an adjusting mechanism (not shown) so as to adjust a height position of the stopper 62, i.e., a distance from the stopper 62 to the contact portion 68. Thus, a rotation angle of the shaft 52, i.e., a slide distance of the stopper member 36, can be adjusted by adjusting the height position of the stopper screw 62.

Returning to FIG. 3, a plurality of the lifting member 40 and the bar receiving member 42 are provided, wherein each of the set of the lifting member 40 and the bar receiving member 42 is disposed on the lateral wall of the stock-rack frames 30 and along the bar mount surface 34.

The lifting member 40 is disposed in the end of the downstream 8B of the bar mount surface 34 in such a manner that a longitudinal axis thereof extends in an upward-downward direction approximately perpendicular to the bar mount surface 34. The lifting member 40 is formed with two elongate holes 72 along a longitudinal direction thereof, and two bolts 74 fixed to the stock-rack frame 30 are received in respective ones of the elongate holes 72. That is, the lifting member 40 is adapted to be linearly movable in the upward-downward direction. The lifting member has a protrusion 76 formed between the elongate holes 72 to allow the lifting member 40 to be rotatably connected to the bar receiving member 42.

The lifting member 40 at the top end thereof has a top surface serving as a bar-lifting surface for lifting a bar W. The lifting member 40 is adapted to be slidably movable between a retracted position where the bar-lifting surface is located without protruding upwardly from the bar mount surface 34, and a lifted position where the bar-lifting surface is located at a height equal to that of a top surface of the holding portion 50 of the stopper member 36.

The bar receiving member 42 has an arm portion 80 formed in a generally L shape, and a receiving portion 82 connected to a distal end of the arm portion 80 on the side of the guide rail 4 and adapted to receive thereon one bar W.

The arm portion 80 has a base end rotatably attached to a shaft 84. The arm portion 80 has an elongate hole 86 formed at a vicinity of a generally L-shaped corner thereof to receive therein the protrusion 76 of the lifting member 40. In this manner, the lifting member 40 and the bar receiving member 42 are linked to each other, so that the lifting member 40 can be moved in association with a movement of the bar receiving member 42. The arm portion 80 also has an elongate hole 88 formed between a position where the bar receiving member 42 is attached to the shaft 84, and a position where the elongate hole 86 is formed on the arm portion 80, and associated with the moving device 44.

The receiving portion 82 is formed in a sectionally V shape which has a first inclined surface 82A far from the arm portion 80, and a second inclined surface 82B close to the arm portion 80. The receiving portion 82 is formed such that, when the bar receiving member 42 is in the bar loading position, the first and second inclined surfaces 82A, 82B are located without crossing the arc-shaped space of the guide rail 4.

The moving device 44 comprises a cylinder fixed to the support frame 2 and provided with a piston rod having a protrusion 90 inserted into the elongate hole 88 of the bar receiving member 42.

The controller 10 is connected to various driving mechanisms, such as the initial-feed member driving mechanism, the feed-rod driving mechanism 20, the feed-rod swinging mechanism, the adjusting mechanism 37, the stopper-member reciprocating device 38 and the moving device 44, and the pump connected to the respective supply pipes 14, so as to control actuations of them. The controller 10 includes a storage section which memorizes therein various predetermined data about positions and distances of the respective members, such as a distance from the bar mount surface 34 to the bar restriction plate 35, a reciprocating position of the stopper member 36 and a moving distance of the initial-feed member, and an oil supply amount of the pump, in the form of a table or an operational functions, in association with a type (diameter, etc.) of a bar W. The controller 10 is operable, based on these stored information, to determine each value of positions and moving distances of the respective members, etc. The controller 10 is also connected to the bar machining apparatus 100 to receive a bar supply signal requesting a supply of bar from the bar machining apparatus 100.

An operation of the bar machining system 200 in the embodiment will be described below.

Firstly, the bar supply mechanism 32 is activated to take one bar W out of a plurality of bars W placed on the stock rack 8, and supplies onto the guide rail 4.

Figure 5:
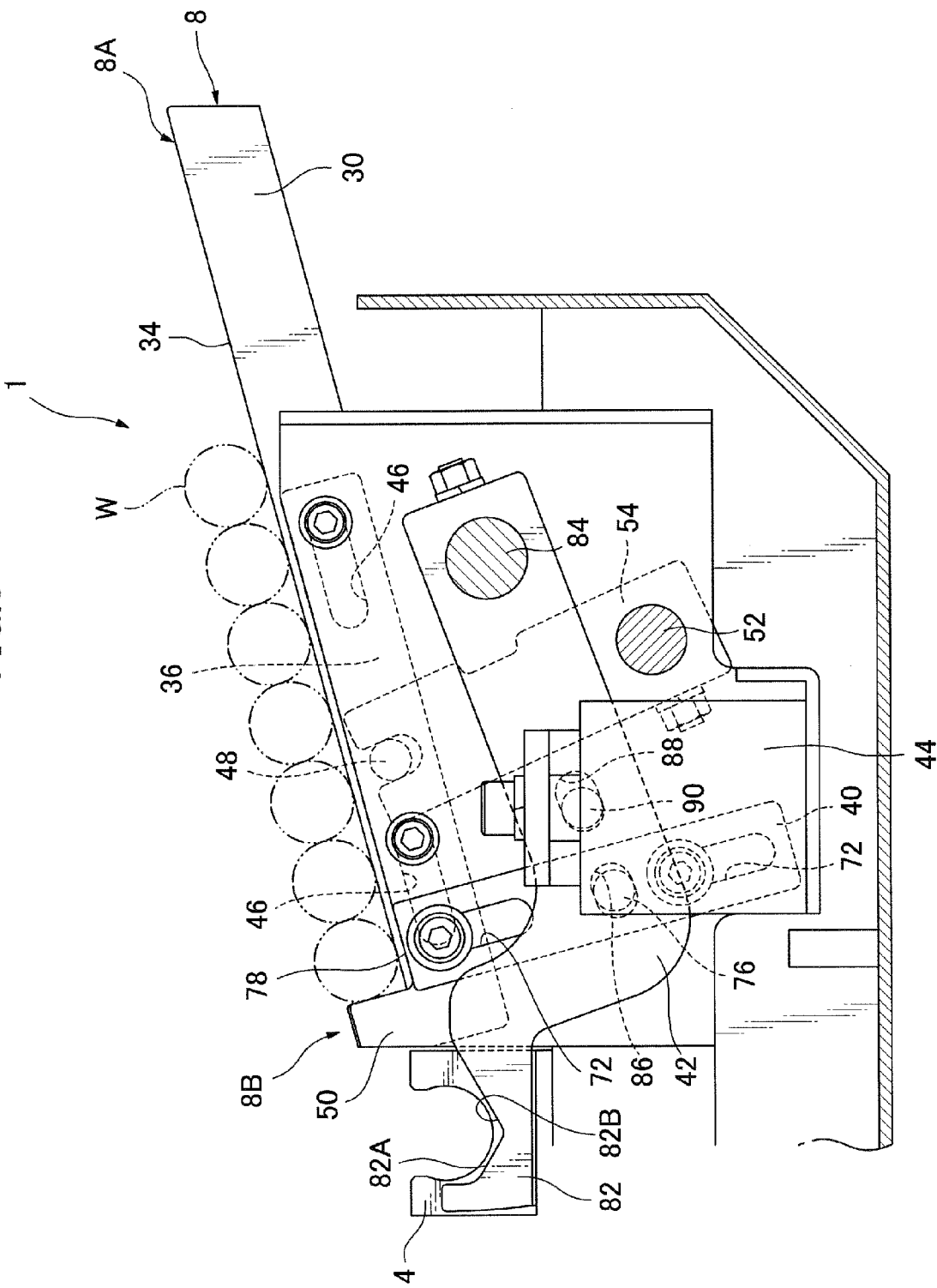
FIG. 5 is an diagram showing an operation of the bar feeder according to the embodiment.

FIGS. 5 to 8 show an operation of the bar supply mechanism 32 of the bar feeder 1 according to the embodiment. As shown in FIG. 5, in an initial position of the bar feeder 1, the stopper member 36 is in the bar takeout position where the holding portion 50 is located close to the guide rail 4, and only the downstreammost one of the bar W is located on or above the lifting member 40. Further, the lifting member 40 and the bar receiving member 42 are in bar loading position where the bar-lifting surface 78 of the lifting member 40 is located without protruding upwardly from the bar mount surface 34, and an upper surface of the receiving portion 82 of the bar receiving member 42 is located without crossing the arc-shaped space of the guide rail 4.

Figure 6:
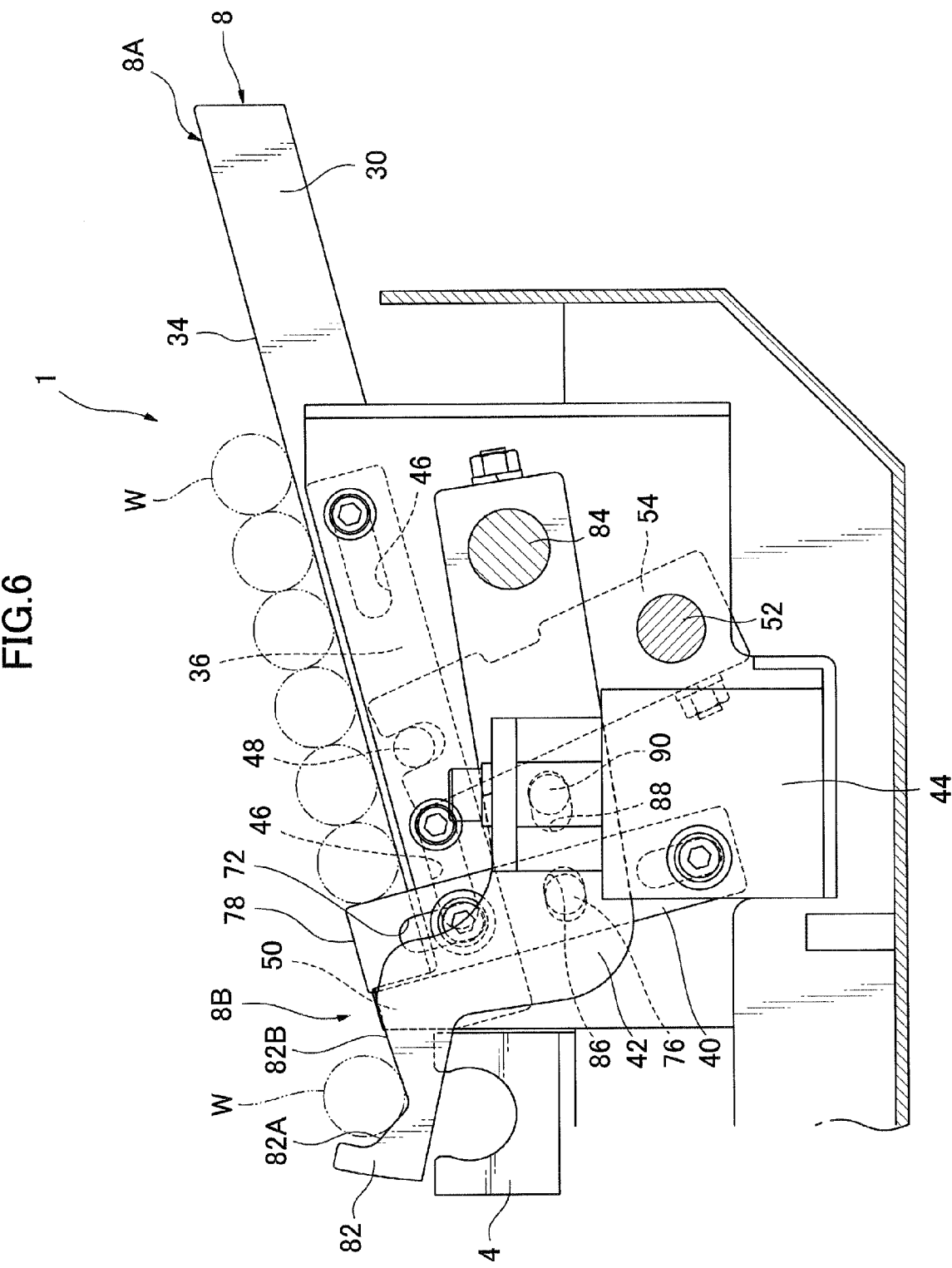
FIG. 6 is an diagram showing an operation of the bar feeder according to the embodiment.

Then, as shown in FIG. 6, the moving device 44 is activated to move the lifting member 40 and the bar receiving member 42 from the bar loading position to the bar receiving position. Specifically, the cylinder serving as the moving device 44 is activated to move the piston rod upwardly. In conjunction with the upward movement, as the protrusion 90 fixed to the piston rod moves, the bar receiving member 42 swings around the shaft 84, and the receiving portion 82 approaches to the lifting member 40. In the bar receiving position, the second inclined surface 82B of the receiving portion 82 is located at a height equal to that of the top surface of the holding portion 50 of the stopper member 36.

The lifting member 40 is connected to the bar receiving member 42 through the protrusion 76 and the elongate hole 86. Thus, in conjunction with the swing movement of the bar receiving member 42, the lifting member 40 moves linearly upwardly along the elongate holes 72. In the bar receiving position, the bar-lifting surface 78 of the lifting member 40 is located at a height equal to the top surface of the holding portion 50 of the stopper member 36 to define an inclined surface in continuous with the second inclined surface 82B of the receiving portion 40.

When the lifting member 40 moves upwardly, only a downstreammost bar W among the bars W placed on the bar mount surface 34 is lifted. In the bar receiving position, the bar-lifting surface 78 of the lifting member 40 is located at the height equal to that of the top surface of the holding portion 50 of the stopper member 36, while being inclined downwardly toward the guide rail 4. Thus, the lifted bar W rolls beyond the top surface of the holding portion 50 and on the bar-lifting surface 78 and the second inclined surface 82B continuous therewith, and thus is received onto the receiving portion 82.

Figure 7:
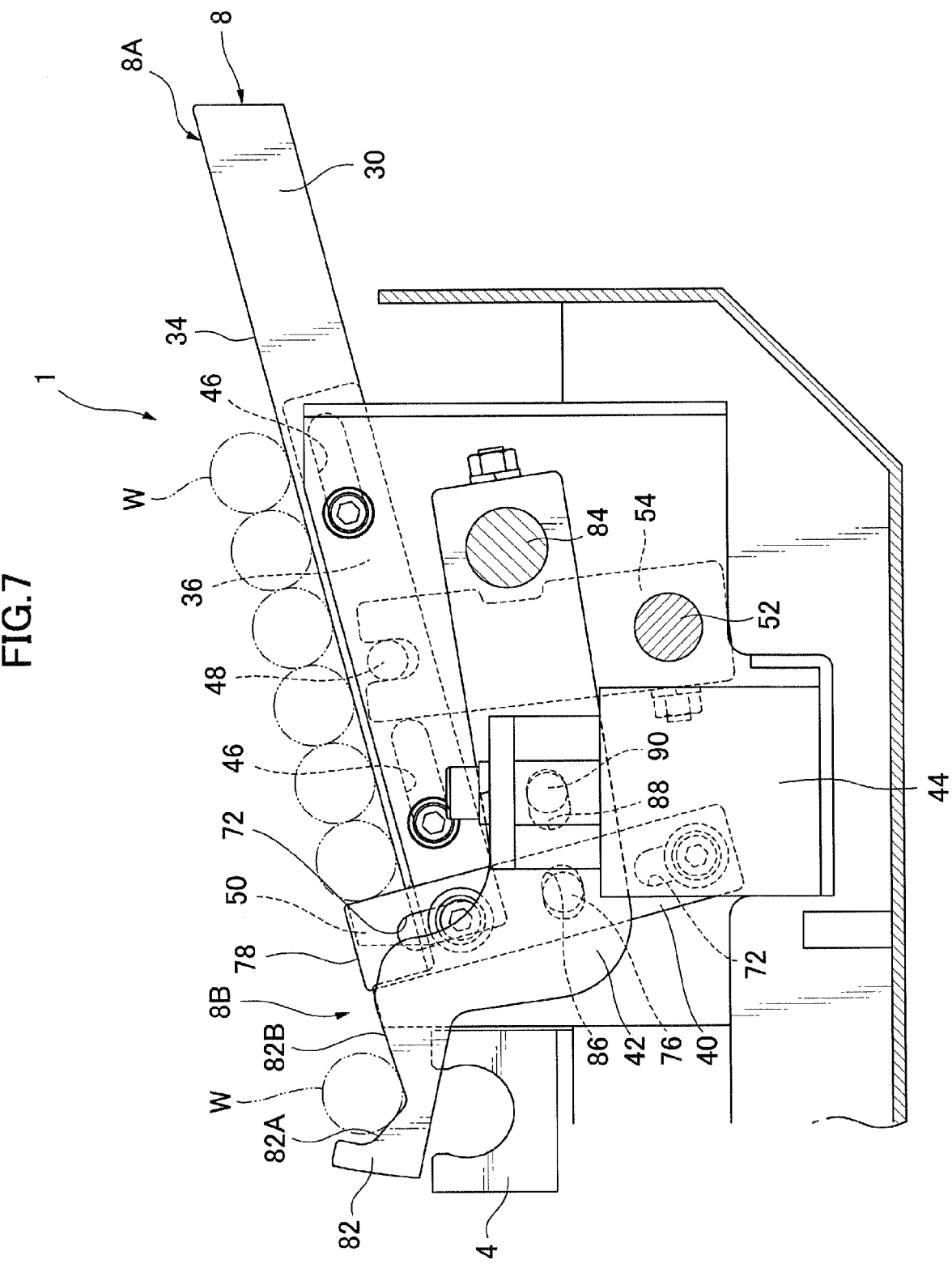
FIG. 7 is an diagram showing an operation of the bar feeder according to the embodiment.

Then, in a state when the lifting member 40 and the bar receiving member 42 is located in the bar receiving position, the stopper-member reciprocating device 38 is activated to move the stopper member 36 from the bar takeout position to the holding position, as shown in FIG. 7. Specifically, the cylinder 60 is driven to retract and move the piston rod 64 upwardly, so that the first end of the actuator member 58 on the side of the cylinder 60 is moved upwardly. In conjunction with this upward movement, the shaft 52 is rotated, and the swing arm 54 swings in a clockwise direction in FIG. 7. Thus, the stopper member 36 slides along the elongate holes 46, i.e., along the bar mount surface 34, from the downstream 8B toward the upstream 8A of the bar mount surface 34. In the holding position, an upstream surface of the holding portion 50 is located in flush with an upstream surface of the lifting member 40, to catch and hold a downstream edge of a second-downstreammost bar W to be subsequently supplied.

Then, in a state when the stopper member 36 is located in the holding position, the moving device 44 is driven to move the lifting member 40 and the bar receiving member 42 from the bar receiving position to the bar loading position, as shown in FIG. 8. In the bar loading position, the bar-lifting surface 78 of the lifting member 40 is located at a height equal to or below that of the bar mount surface 34, and the first and second inclined surfaces 82A, 82B are located at a height equal to or below that of the arc-shaped inner surface of the guide rail 4, as in the state illustrated in FIG. 5. Thus, the bar W received onto the bar receiving portion 82 is supplied onto the guide rail 4.

Then, the stopper-member reciprocating device 38 is driven to move the stopper member 36 from the holding position to the bar takeout position. During this movement, the holding portion 50 of the stopper member 36 holds a new downstreammost (previous second-downstreammost) bar W. Thus, along with the movement of the stopper member 36 to the downstream, the bar W on the stock rack 8 move toward the downstream. The bar restriction plate 35 restricts an upward movement of the bar W to prevent the bar W from stacking in an upward direction thereby arranging the bar W in a line on the stock rack 8

Through the above operation, one cycle of supplying one bar W onto the guide rail 4 is completed. Then, the bar supplying mechanism 32 is on standby for a next bar supplying operation.

Then, the initial-feed-member driving mechanism is activated to move the initial-feed member within the upstream guide rail 4A along the longitudinal direction. Along with this movement, the initial-feed member pushes an upstream end of the supplied bar W to feed the bar W to the downstream guide rail 4B of the bar feeder 1.

After completion of the initial feed of the bar W, the initial-feed member is moved in a upward direction and returned to its original position, and the clamp device 28 immovably clamps the bar W. In the clamped state, the feed-rod swinging mechanism is driven to swing the feed rod 16 around the shaft 26 so as to place the feed rod 16 on an upstream side of the bar W inside the guide rail 4, and hold the upstream end the bar W by the chuck.

After releasing the clamping of the clamp device 28 against the bar W, the feed-rod driving mechanism 20 is driven to move the feed rod 16 along the shaft 26, i.e., the feed axis B, so as to feed the bar W in a downward direction. The bar W moves on the downstream guide rail 4B and introduced into the bar machining apparatus 100.

In case where it is necessary to change a type of the bar W, i.e., a diameter of bar W, to be machined, an operator manually operates a control panel or the like to input or select a type of a bar W or a diameter of a bar W. In response to this input operation, the controller 10 determines parameter values of each member of the bar feeder 1 based on the information about the type of the bar W inputted in the controller 10. Specifically, based on the pre-stored data about each member in association with a diameter of a bar W, the controller 10 determines a position or distance, such as the holding position of the stopper member 36 (a distance from the bar takeout position) or a distance from the bar mount surface 34 to the bar restriction plate 35, and an amount of oil to be supplied to the downstream guide rail 4B and the anti-vibration device 15. Then, the controllers 10 outputs an adjustment signal to each of the adjusting mechanism of the stopper-member reciprocating device 38, the adjusting mechanism of the bar restriction plate 35, and the pump. Based on the adjustment signal from the controller 10, the adjusting mechanism of the stopper-member reciprocating device 38 rotates the bolt 70 to change a position of the stopper 62. Thus, the rotation angle of the shaft 52 is changed, and whereby the moving distance of the stopper member 36 is changed. Further, based on the adjustment signal from the controller 10, the adjusting mechanism of the bar restriction plate 35 moves the bar restriction plate 35 in the upward-downward direction to change a distance from the bar mount surface 34. Based on the adjustment signal from the controller 10, the pump changes a pumping rate of oil therefrom.

In this manner, an operation of automatically adjusting various parameter values of the bar feeder 1 in response to a change in type of a bar W is completed.

The bar feeder 1 according to the above embodiment provides the following adventurous effects.

Both the lifting member 40 and the bar receiving member 42 are driven by the common moving device 44. Thus, as compared with a conventional bar feeder having an independent driving unit for each of the lifting member and the bar receiving member, the number of components of the bar feeder 1 can be reduced to allow the bar feeder to be structurally simplified. This also makes it possible to simplify a maintenance task of the bar feeder 1. In addition, the lifting member 40 is moved in association with the movement of the bar receiving member 42. This makes it possible to reliably supply a bar W onto the guide rail 4 without a need for setting a movement timing between the lifting member 40 and the bar receiving member 42. This is advantageous particularly when it is attempted to further increase a supply capacity of a bar feeder 1.

The stopper member 36 is adapted to move to the holding position so as to hold a second-downstreammost bar W to be subsequently supplied. Thus, it prevents the second-downstreammost bar W from rolling down along the bar mount surface 34 and impose a shock load to the stock rack 8. This makes it possible to prevent damage of the bars W, and reduce vibration of the bar feeder 1 due to the hitting of the second-downstreammost bar W, and noise due to the vibration.

The lifting member 40 is adapted to linearly move, and the bar receiving member 42 is adapted to be swing about the shaft 84. Thus, as the lifting member 40 and the bar receiving member 42 move from the bar loading position to the bar receiving position, the bar receiving portion 42 approaches to the lifting member 40. Then, in the bar receiving position, the second inclined surface 82B of the receiving portion 82 of the bar receiving member 42 is located to be in continuous relation with the inclined bar-lifting surface 78 of lifting member 40. Thus, the downstreammost bar W lifted by the lifting member 40 can smoothly move from the bar-lifting surface 78 to the second inclined surface 82B thereby reducing damage to the bar W.

The bar W received onto the receiving portion 82 is supplied onto the guide rail 4 by swinging the bar receiving member 42 from the bar receiving position to the bar loading position. Thus, a bar can be supplied with less shock, as compared with the conventional bar feeder designed to drop a bar extracted from a stock rack, onto a guide rail. This makes it possible to reduce damage of the bar W and reduce vibration and noise of the bar feeder 1.

The controller 10 can automatically perform an operation of adjusting a parameter value of each member, which is required in response to a change in type (diameter) of a bar W. When a type of a bar W is changed, a conventional bar feeder imposes on an operator a burdensome operation of adjusting respective parameter values of all members associated with the change, whereas the bar feeder according to the above embodiment can automatically perform such adjustment. Thus, the adjustment required in response to a change in type of a bar W can be performed in a significantly simple manner by an operator's operation of inputting a type or diameter of a bar W trough a control panel or the like. This makes it possible to drastically reduce a time for adjusting a parameter value of each member.

It is to be understood that the present invention is not limited to the above embodiment, but various changes and modifications may be made therein. Therefore, unless otherwise such changes and modifications depart from the scope of the present invention hereinafter defined, they should be construed as being included therein.

For example, although the lifting member and the bar receiving member in the above embodiment are designed to linearly move in the upward-downward direction and swing, respectively, the present invention is not limited to this structure, but any other suitable structure capable of interlocking moving the lifting member and the bar receiving member in such a manner as to allow the bar receiving member in the bar receiving position to receive a bar lifted by the lifting member, may be employed. In the above embodiment, the moving device may be connected to the bar receiving member. Alternatively, the moving device may be connected to the lifting member, and the bar receiving member may be interlockedly connected to the lifting member.

In the above embodiment, the common pump is used for supplying oil into the downstream guide rail 4B and the anti-vibration device 15. Alternatively, two independent pumps may be connected to the downstream guide rail 4B and the anti-vibration device 15, respectively. In this case, the controller 10 may be configured to adjust respective pumping rates of the pumps depending on an input thereto about a diameter of bar.

In the above embodiment, a pumping rate of the pump is changed as means to adjust an amount of oil to be supplied into the downstream guide rail 4B and the anti-vibration device 15. Alternatively, a control valve may be mounted on the oil supply pipe, and the controller may be configured to adjust an opening of the control valve.

Further, the controller may be provided in the bar machining apparatus, instead of providing in the bar feeder.

What is claimed is:

1. A bar feeder for feeding bar to a bar machining apparatus along a feed axis, comprising:
 a stock rack having a bar mount surface for allowing bar or bars to be placed thereon:
 a guide rail for guiding one of the bar taken out of the stock rack along the feed axis; and
 a bar supply mechanism for taking the bar one by one out of the stock rack and supplying the taken-out bar onto the guide rail,
 wherein:
 the bar mount surface is inclined downwardly in a direction from an upstream thereof far from the guide rail to a downstream thereof close to the guide rail; and
 the bar supply mechanism includes:
  a stopper member protruding upwardly from the bar mount surface at the downstream thereof to prevent the bar from dropping from the bar mount surface;
  a lifting member adapted to move upwardly at the downstream end of the bar mount surface to lift only a downstreammost one of the bar which is adjacent to the stopper member;
  a bar receiving member connecting the lifting member thereto, formed with a receiving portion for receiving thereon the downstreammost bar lifted by the lifting member, and adapted to supply the bar received on the receiving portion to the guide rail; and
 moving device adapted to move the bar receiving member and the lifting member between a bar receiving position where the bar is lifted up to a height of the stopper member and the receiving portion is aligned with the lifting member, and a bar loading position where the lifting member is retracted to a height equal to or below that of the bar mount surface and the receiving portion is located at a height equal to or below that of the guide rail; wherein
 the stopper member is slidable along the bar mount surface between a bar takeout position where only a downstreammost one of the bar is permitted to be located on or above the lifting member when the lifting member is in the bar loading position, and a holding position where the stopper member approaches and holds a second-downstreammost one of the bar to be subsequently supplied when the lifting member is in the bar receiving position and wherein the stopper member reciprocates between the bar takeout position and the holding position in every bar supply cycle.

2. The bar feeder as defined in claim 1, wherein the bar receiving member is adapted to be swing, and the lifting member is adapted to linearly move in up and down direction, whereby, when the bar receiving member moves from the bar loading position to the bar receiving position, the receiving portion approaches to the lifting member, and positioned to be in continuous relation with a bar-lifting surface of the lifting member at the bar receiving position.

3. The bar feeder as defined in claim 1, wherein:
 the bar-lifting surface of the lifting member extends up to a vicinity of the guide rail with a downward inclination; and
 the receiving portion has an inclined surface which is positioned to be in continuous relation with the bar-lifting surface at the bar receiving position.

4. The bar feeder as defined in claim 1, which further comprises:
 a bar restriction member disposed above and in spaced-apart relation to the stock rack by a distance corresponding to a diameter of the bar so as to allow the bar placed on the stock rack to be arranged in a line; and restriction-member driving device adapted to move the bar restriction member closer and farther relative to the bar mount surface.

5. The bar feeder as defined in claim 4, which includes a controller operable to control the restriction-member driving device so as to determine a distance from the bar mount surface to the bar restriction member depending on an input of a diameter of a bar to be machined.

6. The bar feeder as defined in claim 1, which includes a controller operable to control the stopper member so as to determine the bar takeout position and the holding position depending on an input of a diameter of a bar to be machined.

* * * * *